C. J. ANDERSON.
ELECTRIC MOTOR STARTING DEVICE.
APPLICATION FILED JULY 14, 1910.
1,023,491.
Patented Apr. 16, 1912.
4 SHEETS—SHEET 2.
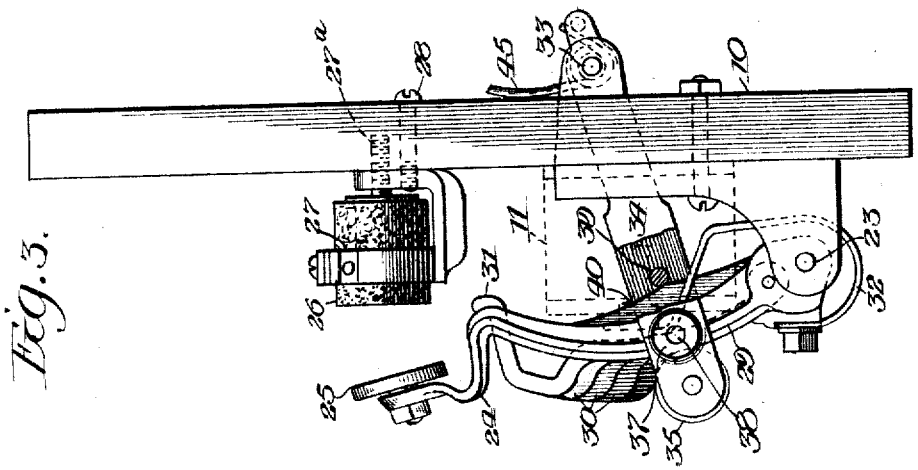
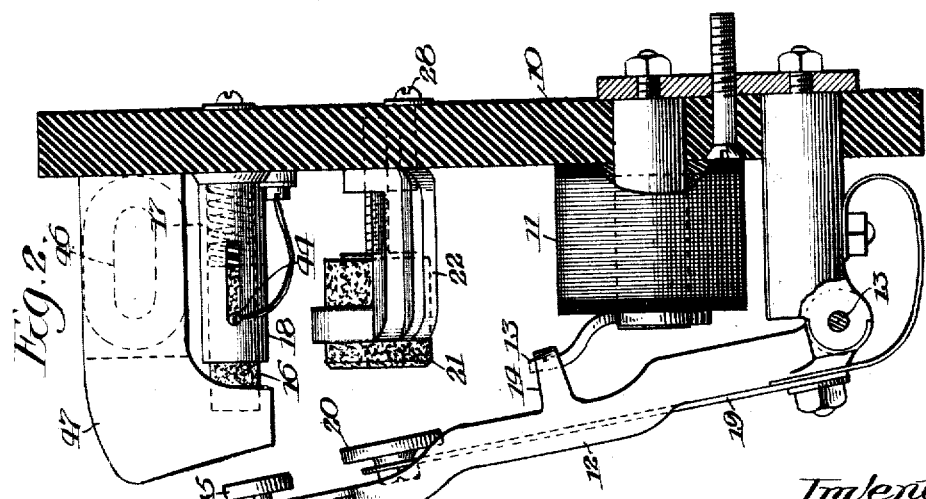

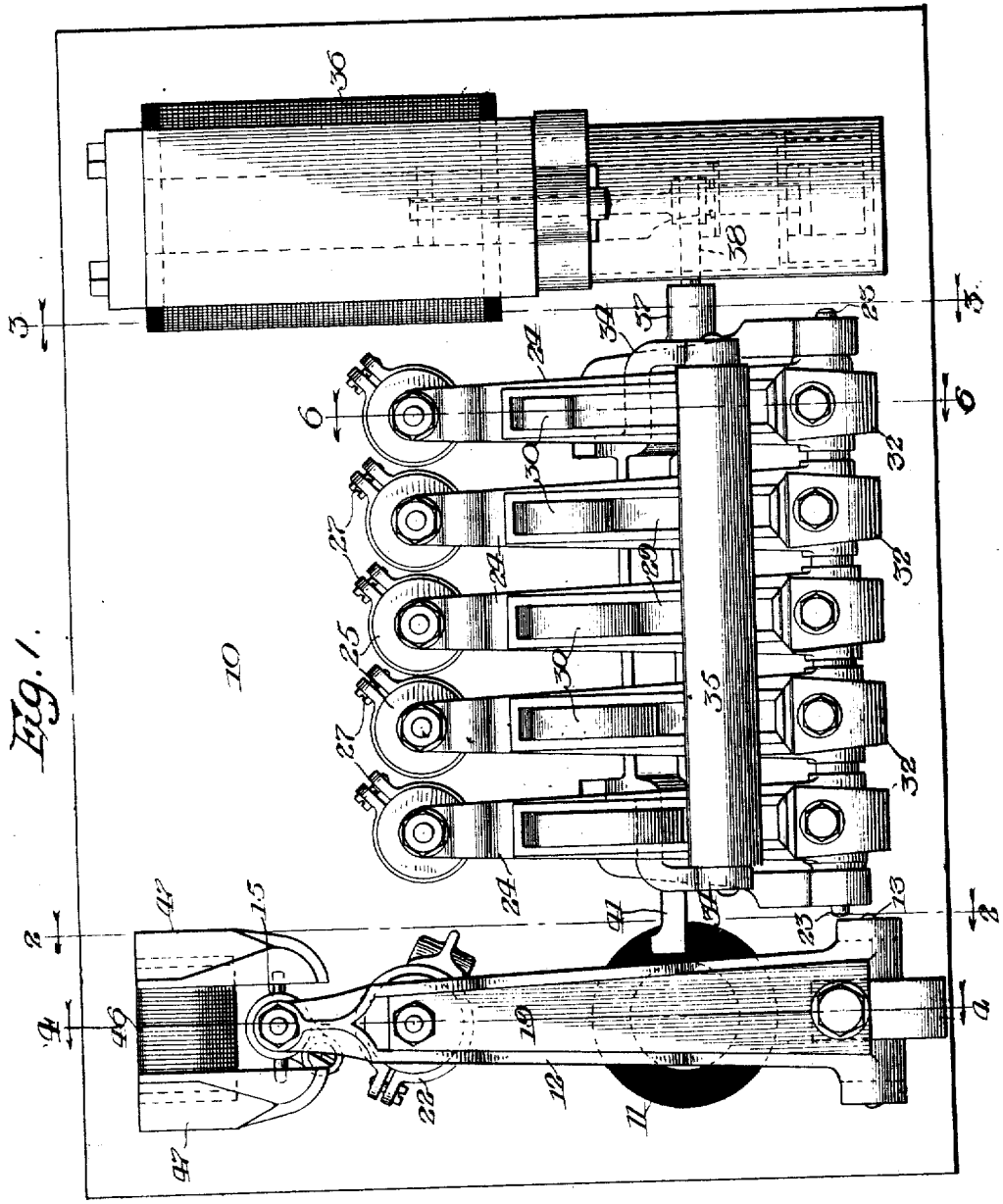

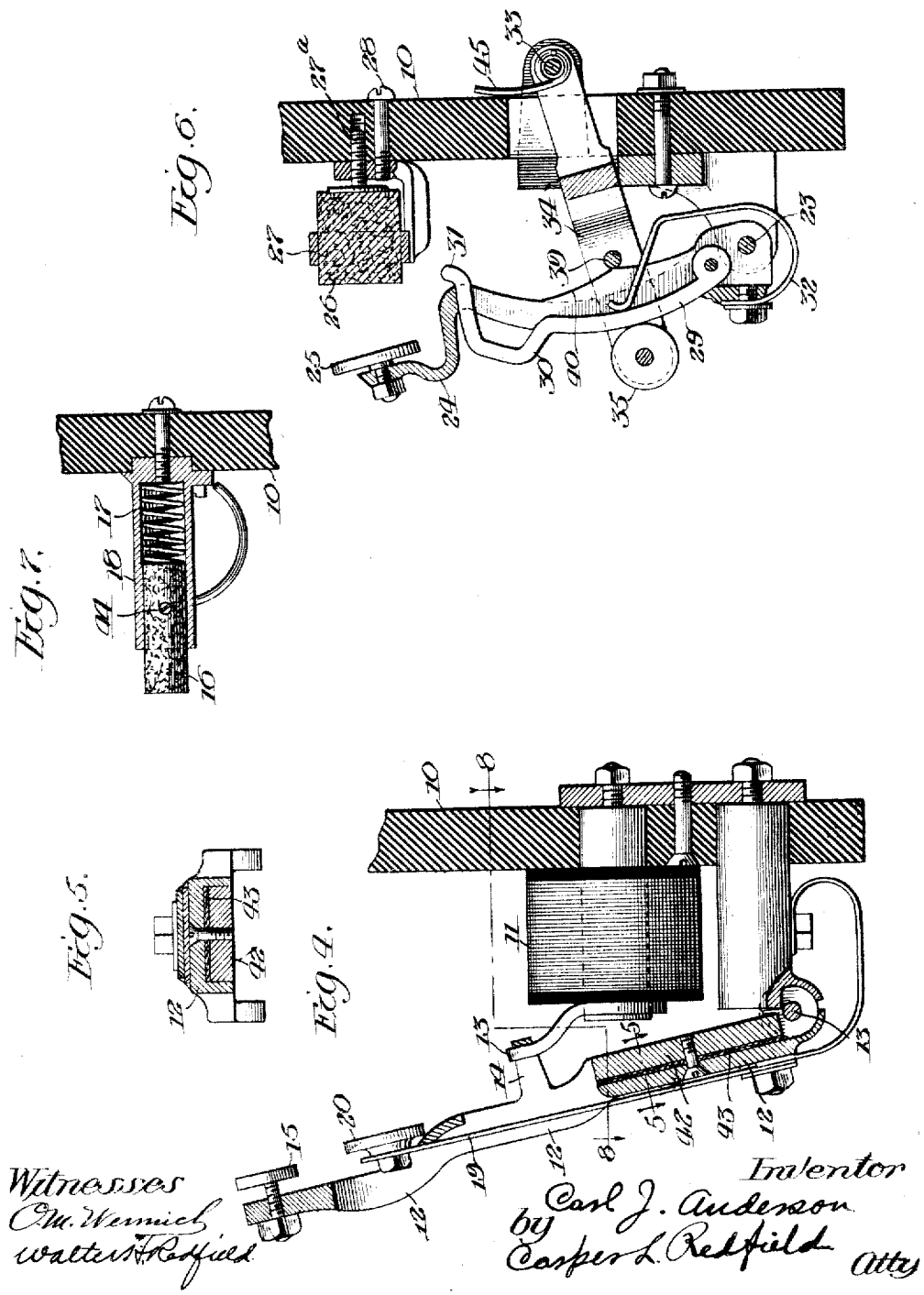

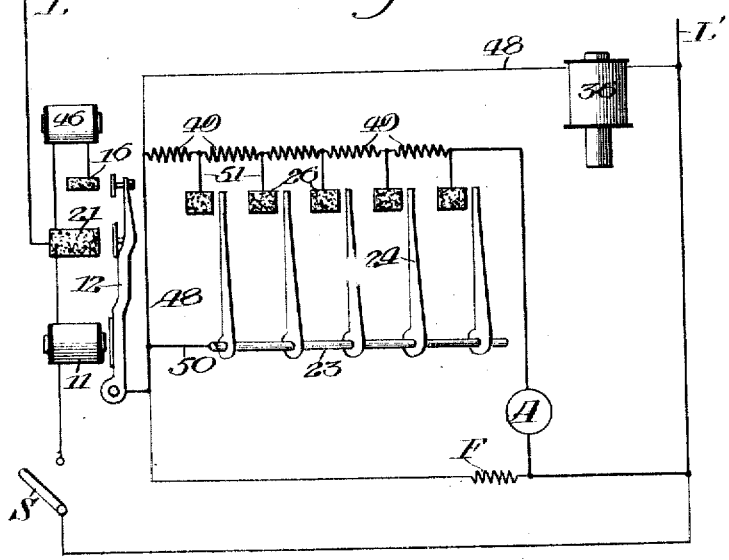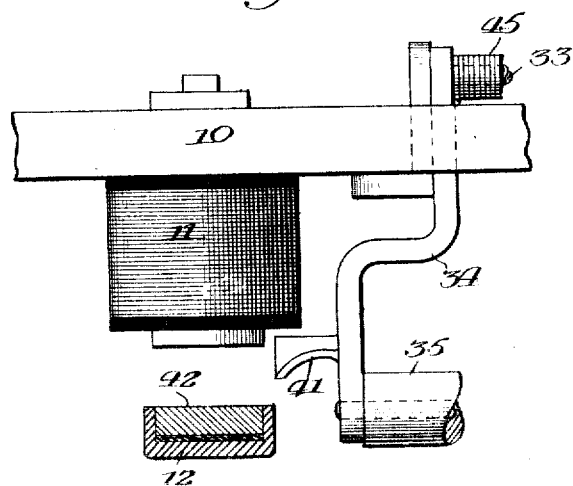

UNITED STATES PATENT OFFICE.

CARL J. ANDERSON, OF CHICAGO, ILLINOIS.

ELECTRIC-MOTOR-STARTING DEVICE.

1,023,491.  Specification of Letters Patent.  Patented Apr. 16, 1912.

Application filed July 14, 1910. Serial No. 571,891.

*To all whom it may concern:*

Be it known that I, CARL J. ANDERSON, a citizen of the United States of America, and a resident of Chicago, county of Cook, and State of Illinois, have invented certain new and useful Improvements in Electric-Motor-Starting Devices, of which the following is a specification.

My invention relates to starting devices for electric motors and has for its object improvements in such devices.

In the accompanying drawings Figure 1 is a front elevation, Fig. 2 is a section on line 2—2 of Fig. 1, Fig. 3 is a section on line 3—3 of Fig. 1, Fig. 4 is a partial section on line 4—4 of Fig. 1, some parts being in elevation and some parts being omitted, Fig. 5 is a transverse section on line 5—5 of Fig. 4, Fig. 6 is a section on line 6—6 of Fig. 1 parts being in elevation, Fig. 7 is a sectional detail, Fig. 8 is a partial detail being a plan representing a section substantially on line 8—8 of Fig. 4, Fig. 9 is a diagram of the electric circuits controlled by the device.

The various parts of this device are mounted upon a board 10. On the lower left hand portion of this board is a magnet 11 which controls an armature lever 12 pivoted at 13 near the bottom of the board. The distance this armature falls away from the magnet 11 is controlled by a stop 13 secured to the magnet 11 and a hook 14 on the armature lever 12. These are merely conveniences, as the armature lever may have its stopping device in any other form or at any other place.

At the upper end of the lever 12 is an adjustable contact point 15 which is adapted to engage a carbon contact 16 supported by a spring 17 in a casing or hollow post 18. Secured near the lower end of the armature lever 12 is a spring 19 on the upper end of which is secured a contact piece 20 adapted to engage another carbon contact 21 supported in a clamping device 22. Near the bottom central part of the board 10 is a shaft 23 upon which are loosely pivoted a series of levers 24. On the upper ends of these levers are adjustable contact pieces 25. The adjustment of these pieces 25 and of the previously mentioned piece 15 is by means of nut and screw as shown. These contact pieces 25 are adapted to engage carbon contacts 26 supported in clamping devices 27. The inner ends of these contacts 26 are secured to pins 27ª which are screwed into the plate 10. By releasing the clamp 27 and turning the carbon contact 26, the height of the contact may be adjusted to any desired position. When at the desired position, a tightening of the clamping device 27 will hold the contact in a fixed position and will furnish a good electrical path for a current flowing through the contact 25. The axial strain is principally on the screw. The detailed construction of this arrangement is shown in Fig. 6 and in essence is the same construction as that used for holding carbon contact 21 before described. These clamping devices 22 and 27 are in reality brackets which are held to the place by screws 28. Pivoted on each one of the levers 24 is a secondary lever 29 provided with a cam surface 30. These cam surfaces project through openings in the centers of the levers 24 and have small projections 31 at their upper ends which limit their outward movements through these openings. Springs 32 secured to levers 24 press these secondary levers outward with their ends 31 in engagement with the levers 24. The cams 30 on each one of the levers 29 is of a different length as shown in Figs. 1 and 3.

Pivoted at 33 on the back of the board is a bail 34 which has on its central portion a roller 35. This bail extends through openings in the base 10 to the front thereof and straddles the entire series of levers 24. The roller 35 is adapted to engage the cam surfaces 30 when the said roller is raised by swinging the bail 34 on its pivot 33. In the raising of the roller 35 in this way, it engages the cams 30 in succession so as to move the levers 24 successively inward, thus causing the contacts 25 to successively engage the contacts 26. Springs 32 are of sufficient strength so that the levers 24 will be moved without deflecting the springs 32 so as to move the projections 31 away from engagement with the levers 24. When, however, the contacts 25 engage the contacts 26, the secondary levers 29 will be moved slightly on their pivots so as to move the projections 31 away from the levers 24. The object of this is to cause the contacts between the contact pieces 25 and contacts 26 to have a uniform and definite pressure determined by the tension of the springs 32. The adjustment of the contacts 26 as previously described is for the purpose of causing a desired amount of such deflection.

At the right hand side of the base 10 is a solenoid 36 provided with a dash-pot attached to the lower portion as indicated by dotted lines in Fig. 1. The details of such dash-pot being well known, it is not necessary to here describe them. On one side of the bail 34 is a boss 37 having a projecting pin 38 which extends into a connection to the connection between the solenoid and the dash-pot. This construction is so arranged that when the solenoid is actuated, the pin 38 and boss 37 will be raised so as to turn the bail 34 on its pivot 33 and cause the roller 35 to move on the cam surfaces 30 and thereby move the levers 24 to close the contacts 25 on the contacts 26. When the solenoid 36 is deënergized, the weight of the several parts thus mentioned will cause the bail 34 to drop again to its lowest position, thus permitting the levers 24 to move outward. To insure this movement, there is in the bail 34 a cross rod 39 which is adapted to engage cam surfaces 40 on the inner edges of the levers 24. This cross rod 39 not only moves the levers 24 outward, but also, when the bail 34 is at its lowest position, prevents any one of the levers 24 from being accidentally moved inward so as to close the connection between 25 and 26. This cross rod is therefore not only an actuating device for moving the levers 24 outward but is also a safety device for preventing accidental closure of circuits. On the other side of the bail 34 is a metallic projection 41 which is of the general form shown in Figs. 1 and 8. When the bail is at its lowest position, this projection is closely adjacent to the core of the magnet 11 and also closely adjacent to the armature lever 12, the armature of which is represented at 42. When the bail is at its upper position or any other position other than its lowest position, this projection is removed from proximity to the core of the magnet 11. The arrangement is such that when the armature lever 12 falls back away from the magnet 11 the distance between the armature 42 and the pole of the magnet 11 will be too great for the magnetic force of the magnet acting directly on the armature to attract the armature lever. The object of this projection extending closely adjacent to the core of the magnet 11 and to the armature 42 is to furnish a magnetic path between the two which will be effective to attract the armature and overcome the weight of the levers when the projection 41 is in its lower position. Going back a step farther in the proceedings, the object of furnishing this magnetic path at one time and not at another, is to prevent the attraction of the armature lever 12 at a time when the roller 35 is not at its lowest position; in other words, it is desirable to prevent the closure of the circuit through the contacts 16 and 21 at all times excepting when the circuit is open through all of the contact 26 and their contacts 25. Thus, if for any reason the bail 34 should become stuck and not fall to its lowest position so as to open all connections to the contacts 26, then any current sent through the magnet 11 will fail to close the circuit through the contacts 21 until the difficulty has been overcome by causing the roller 35 to fall to its lowest position.

The magnet 11 is a rather large and powerful one and the armature lever 12 is comparatively heavy; attracting this armature quickly by a powerful magnet would normally cause a somewhat heavy blow and jarring shock by contact between the armature 42 and the pole of the magnet 11. To mitigate the severity of this shock and reduce the pounding action as much as possible, I insert a soft packing 43 between the armature 42 and the lever 12. The construction involved in inserting this packing is shown in detail in Figs. 4 and 5.

It has previously been mentioned that the contact 20 is mounted on a spring 19 so as to make a yielding contact between the said contact 20 and contacts 21. The contact 15 might similarly have been placed upon a spring, but I have chosen to mount the contact in hollow post 18 upon the spring 17 and retain its outward movement by cross pin 44. The details of this construction are shown in Figs. 2 and 7.

It has been previously mentioned that the solenoid turns the bail 34 on its pivot 33. The said bail with its roller 35 and the parts connected with the solenoid being somewhat heavy, I have applied a spring 45 around the pivoting shaft 33 as a means of partly balancing the weight of these parts. This spring is not sufficient to fully balance the weight of the parts because it is desired that the weight of these parts will be sufficient to have them fall with a fair degree of rapidity and to force outward the levers 24 so as to separate the contacts 25 from the contacts 26.

In the upper part of Figs. 1 and 2 is shown a magnet 46 having its pole pieces 47 extending each side of the contact 16. When the armature lever 12 is attracted, contact is made between 15 and 16 before it is made between 20 and 21, also when the armature lever 12 falls back the connection is broken between 20 and 21 before it is between 15 and 16. The location of the pole pieces 47 on each side of the contact 16 is to act as a blow-out in a manner well known.

The circuit which this device controls is shown in Fig. 9 in the form of a diagram In the said diagram A is an arbitrary representation of the armature of the motor which is to be started and F is an arbitrary representation of the field of said motor. S is a switch intended to be closed by hand or in any other manner, and L and L¹ are the lines leading to the source of energy for operating the motor. Assuming that the roller 35 is at its lowest position and that the switch S is closed, a current will flow from the line L through the magnet 11 to the other limb of the line. The current through the magnet 11 will attract the armature 12 and close connection to the contacts 16 and 21. A branch current then flows from the line L through the contact 21 and lever 12 to the line 48 and thence through the solenoid 36 to the other limb of the line L¹. This will actuate the solenoid to raise the roller 35 and thereby move the arms 21 in succession to their contacts 26. In thus closing the connections to the contacts, connection is first made to the contact on the left hand of the diagram, then to the one next to it, and so on step by step down to the end. Going back a moment to the circuit originally mentioned through the line 48 and the solenoid 36, it is to be noticed that there is a branch from the line 48 through a series of resistances 49 and the armature A and thence on to the line L¹. The closure of the connection through the solenoid 36 and to the armature A being simultaneous and there being a very large amount of resistances on the line leading to the armature A, only a small amount of current will flow through said armature upon the first closure to the contact 21. Immediately however, upon the first lever 24 engaging its contacts 26 there will be another branch from 48 through 50 and the shaft 23 and said first lever. This will cut out that part of the resistance 49 which lies between the connection 51 and the line 48. Thus upon the closure of the first lever 24, there will be a slight increase in the amount of current flowing through the armature A. Immediately upon the closure of the second lever 24 of its contacts 26 another portion of the resistance 49 will be cut out and a still greater amount of current will flow through the armature A. As the levers 24 are closed successively to their contacts, the amount of resistance is cut out successively until the last lever 24 is closed to its contact. When the entire amount of resistance is cut out, the current flows directly through the shaft 23 and said last lever and its contact, thus giving full current to the armature A of the motor.

It will be seen from the foregoing description that in closing the switch 12, the field F receives the full line potential that it is intended to receive, but that the amount of current which reaches the armature A is at first very small. Also that the amount of this current through the armature A is increased step by step until the full amount flows through said armature.

What I claim is:—

1. The combination with a series of stationary contacts and a corresponding series of movable contacts, of a roller mounted upon pivoted arms, and an electro-magnetic device for moving said arms so as to cause the roller to close the movable to the stationary contacts in succession.

2. In a device of the character described, a series of movable contacts and supports therefor, a roller, pivoted arms upon which the roller is mounted, and an electric-magnetic device for moving the arms so as to cause the roller to engage the supports for the movable contacts.

3. The combination with a series of stationary contact pieces, a corresponding series of movable contact pieces, pivoted levers upon which the movable contact pieces are supported, a pivoted bail adapted to engage the levers so as to move the same successively, and electro-magnetic means for operating the bail, of a part carried by the bail and serving to lock the levers so as to prevent them from being moved so as to cause accidental closure of the movable contact pieces to the stationary ones.

4. The combination with a series of contact devices, and a corresponding series of arms for closing them, of a spring supported cam pivoted to each arm, and an electrically controlled device for engaging said cams to operate said arms in succession.

5. A series of stationary contacts, a separate pivoted arm for each contact, a roller adapted to be moved simultaneously over said arms, cams carried by the arms and so arranged that upon the roller being moved over them the arms will be moved successively to engagement with their contacts, and a yielding connection between each cam and its arm.

6. A bail provided with a roller on its central portion, a series of arms provided with cams, electrically controlled means for moving said bail on its pivot so as to cause the roller to move over and engage the cams, and a series of electrical connections closed successively by said arms through the action of said roller on said cams.

7. The combination with a pivoted bail provided with a roller on its central portion, and a solenoid for moving the bail on its pivot, of a series of contact devices, an arm for each contact device, said arms being located within said bail and in a position to be engaged by the roller when the bail is moved by the solenoid and means by which such movement of the bail will cause said arms to close the contact devices in succession.

8. The combination with a circuit provided with a resistance, a series of contact devices for cutting out parts of said resistance in succession, and a movable member for controlling the open and closed condition of said contact devices, of a magnet and armature for initially closing said circuit, said armature when free from said magnet being supported at such a distance from the pole of the magnet that the magnetic force is insufficient to move the armature, and a metallic body carried by the controlling member and so related to said magnet and its armature as to furnish a magnetic path between the magnet and its armature when the controlling member is in a position to maintain said contact devices open.

9. The combination with a movable body, and an electrical contact closing device the open and closed condition of which is determined by the position of the movable body, of a magnet, an armature therefor located beyond the operative range thereof, and a metallic body adapted to be moved adjacent to the magnet and its armature so as to furnish a magnetic path from one to the other, the position of said metallic body being controlled by the position of said movable body.

10. A magnet and armature therefor, said armature being located beyond the operative range of the magnet, and a body movable to and from a position adjacent to the magnet and its armature, said body when adjacent to the magnet and armature serving a magnetic path from one to the other, substantially as described.

11. The combination with a magnet and an armature therefor, of circuit closing devices, a member for controlling the open and closed condition of the circuit closing devices, and means by which the magnetic effect of the magnet upon its armature is controlled by the position of said member.

Signed at Chicago, Ill., this 11th day of July 1910.

CARL J. ANDERSON.

Witnesses:
C. L. REDFIELD,
WALTER H. REDFIELD.